United States Patent [19]

Hutchison et al.

[11] Patent Number: 5,390,479
[45] Date of Patent: Feb. 21, 1995

[54] IMPLEMENT DRIVE STRUCTURE

[75] Inventors: Wayne R. Hutchison, Mayville; Daniel A. Sebben, West Bend, both of Wis.

[73] Assignee: Deere & Company, Moline, Ill.

[21] Appl. No.: 80,945

[22] Filed: Jun. 22, 1993

[51] Int. Cl.⁶ ............................................. A01D 69/10
[52] U.S. Cl. ..................................... 56/11.3; 56/15.2; 56/15.8; 56/15.9
[58] Field of Search ............... 56/6, 10.1, 10.8, 11.4, 56/11.9, 14.7, 15.2, 15.8, 15.9, 16.9, DIG. 6, DIG. 9, DIG. 10, DIG. 22

[56] References Cited

U.S. PATENT DOCUMENTS

| | | | |
|---|---|---|---|
| 3,696,594 | 10/1972 | Freimuth et al. | 56/15.2 |
| 3,789,684 | 2/1974 | Freier, Jr. | 74/230.17 D |
| 3,795,094 | 3/1974 | Mollen et al. | 56/11.1 |
| 4,102,114 | 7/1978 | Estes et al. | 56/15.2 |
| 4,120,136 | 10/1978 | Rose | 56/17.1 |
| 4,226,313 | 10/1980 | Meldahl et al. | 192/18 R |
| 4,693,063 | 9/1987 | Hoepfner et al. | 56/16.6 |
| 4,733,522 | 3/1988 | Johansson | 56/17.4 |
| 4,809,489 | 3/1989 | Johansson | 56/14.7 |
| 4,920,734 | 5/1990 | Wenzel | 56/11.1 |

OTHER PUBLICATIONS

Craftsman, Service and Adjustments, one page (p. 20), publication data unknown but is prior art to this application, U.S.A.

John Deere, Manual Lawn Tractor, one page (p. 51), publication date unknown but is prior art to this application, U.S.A.

Murray, Maintenance, one page (p. 24), publication date unknown but is prior art to this application, U.S.A.

Primary Examiner—Ramon S. Britts
Assistant Examiner—Pamela Anne O'Connor

[57] ABSTRACT

An improved drive structure is provided for use between a lawn and garden type vehicle and a vertically adjustable belt driven, belly-mounted implement such as a rotary mower. The structure is usable with a standard length engine crankshaft which is mountable to project below the vehicle chassis and power the belt driven mower. It includes a stub shaft extension that is adapted to carry an electric clutch as well as a pulley for driving a belt entrained around the mower spindle pulleys. The extension permits positive power transmission to the drive pulley and also allows for it to be mounted substantially horizontal with the implement pulleys as they are shifted vertically in response to height of cut adjustments and/or variation in terrain. The extension further eliminates the need for jack-sheave power relay arrangements commonly used to reduce the angles of drive belt entry and exit into and out of drive and driven pulleys.

9 Claims, 3 Drawing Sheets

5,390,479

IMPLEMENT DRIVE STRUCTURE

BACKGROUND OF THE INVENTION

1. Field of the Invention

The present invention relates to a drive structure useable with a lawn and garden tractor that carries and powers an implement such as a rotary mower.

2. Description of the Related Art

Many vehicles, such as lawn and garden tractors, are adapted to carry and operate a variety of implements such as rotary lawn mowers. It is common for these types of implements to be carried beneath the chassis of the vehicle and to be adapted for up and down adjustment throughout a range of operation. More specifically, belly-mounted implements, such as rotary grass mowers, can typically be adjusted to provide for a desired height of cut. To drive the blade or blades of a rotary mower, a pulley and belt arrangement is commonly provided beneath the vehicle chassis, with the engine generally carried above the chassis, and the crankshaft projecting through the chassis. Coupled with the engine crankshaft is a pulley around which is entrained a V-belt that is also entrained around the pulley or pulleys carried on the spindle or spindles of the mower implement.

Since the pulley carried by the engine crankshaft cannot easily be raised and/or lowered due to the fact the engine is bolted to the vehicle chassis and since the implement must be raised and/or lowered for different heights of cut, the angle at which the drive belt moves into and out of the drive pulley, as well as the driven pulleys, will vary with the adjusted height of the implement. Accordingly, excessive angles of entry and/or exit of the belt into and out of the pulleys can cause excessive belt wear on and/or premature failure of the belt.

Because it is desirable to minimize these angles of entry and exit, jacksheave arrangements have been used to vertically step the power downwardly. A jacksheave typically includes a vertical shaft rotatably coupled with two vertically spaced pulleys, the top pulley being driven by a belt powered by the crankshaft and the botton pulley in turn being used for driving the implement pulley. A second belt is mounted around the lower pulley carried on the jacksheave to drive the spindle and/or spindles of the mower. Through this stepped power transmission, the lower pulley of the jacksheave arrangement is provided closer to the horizontal plane at which the mower blade pulleys on the implement operate. Such an arrangement obviously requires additional pulleys, shafts, and belts and presents increased maintenance problems and costs due to the extra parts. Further, it may restrict the vertical adjustability of the implement beneath the chassis.

To minimize the number of parts required, improve the implement vertical adjustment range, and keep the angles of entry and/or exit of the belt into the various pulleys within an acceptable, narrower range of operation, it would be desirable to provide a belt implement drive structure wherein a single belt could be used between the engine and implement without the use of a jacksheave arrangement.

SUMMARY OF THE INVENTION

Towards this end, there is provided an extension mountable to the standard length crankshaft of an off-the-shelf engine. The extension lengthens the crankshaft projection below the chassis of the vehicle to permit a pulley to be mounted in a plane lower and closer to the level of the pulleys carried by the spindles of the mower.

The extension takes the form of collar that surrounds the lower end of the crankshaft and includes a key that can be used to secure the collar to the shaft for rotation therewith. The collar, in turn, carries at its lower end a shaft extension to which can be removably mounted an electric clutch and/or a drive pulley. This extension length can be chosen for the respective dimension of the vehicle and implement it is used with. The arrangement permits the crankshaft of the engine to effectively be extended below the chassis and position a drive pulley nearer to the plane of operation of the implement driven pulleys.

By providing an extension keyed to the engine crankshaft and a shaft extension rigidly coupled with the extension collar, there is provided a quick, easy means for lowering the drive line of the belt drive between an engine and belly-mounted implement which can utilize a standard, commercial electric clutch drive pulley arrangement. This permits use of an off-the-shelf engine on a vehicle chassis without requiring modifications to either the standard engine crankshaft or the chassis to provide a drive pulley operating at a lower projected level.

BRIEF DESCRIPTION OF THE DRAWINGS

FIG. 5 illustrates an enlarged perspective schematic of the crankshaft extension structure.

DESCRIPTION OF THE PREFERRED EMBODIMENT.

Figure 1:
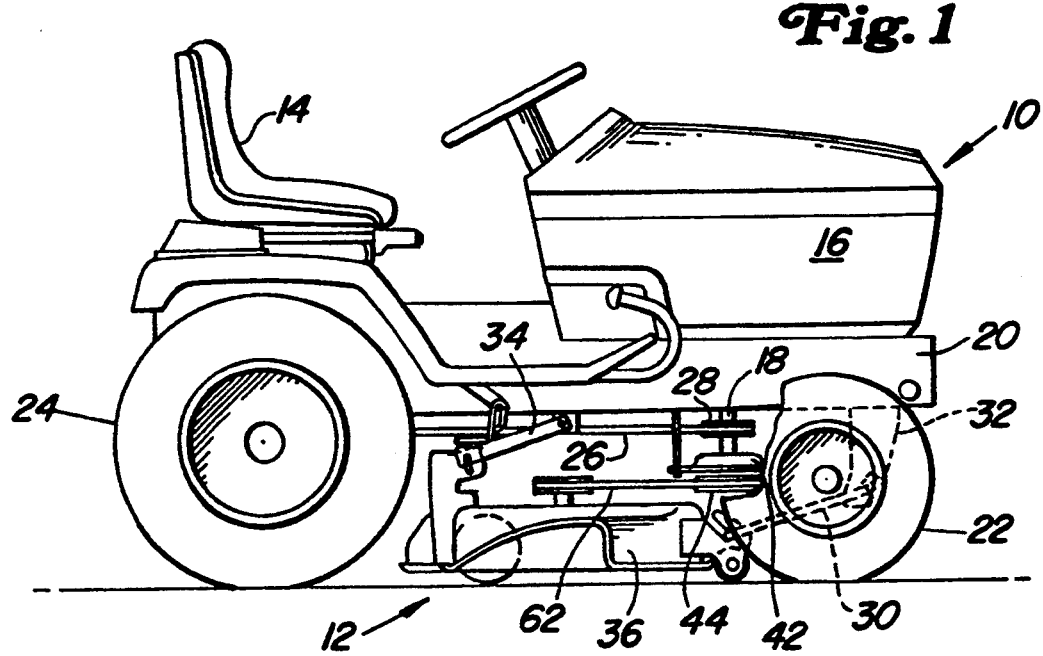
FIG. 1 illustrates a side view of a lawn and garden vehicle which carries a belly-mounted implement utilizing the drive structure of the present invention.

Looking now to FIG. 1, there is illustrated a lawn and garden type vehicle 10 carrying a rotary mower implement 12 therebeneath. The vehicle 10 includes a operator seat 14, an engine cowling 16, and an engine (not shown) which has its crankshaft 18 extending through the chassis 20 and projecting beneath it. The vehicle 10 further includes front steerable wheels 22 as well as rear drive wheels 24 which are powered by a belt 26 driven by a pulley 28 carried on the crankshaft 18.

The implement, which is a rotary mower 12, is vertically adjustable and, in the preferred embodiment, adjustable for cutting a length of grass between 1 and 3½ inches. It is attached to the vehicle 10 by front tow rods 30 which pull it along and which are, in turn, attached to downwardly projecting frame structures 32 carried by the vehicle 10. At its rear portion, the implement 12 is attached to the vehicle 10 by a four bar linkage-type arrangement, one side bar 34 extending from the chassis 20 rearwardly to the mower on each side of the mower deck 36.

Figure 2:
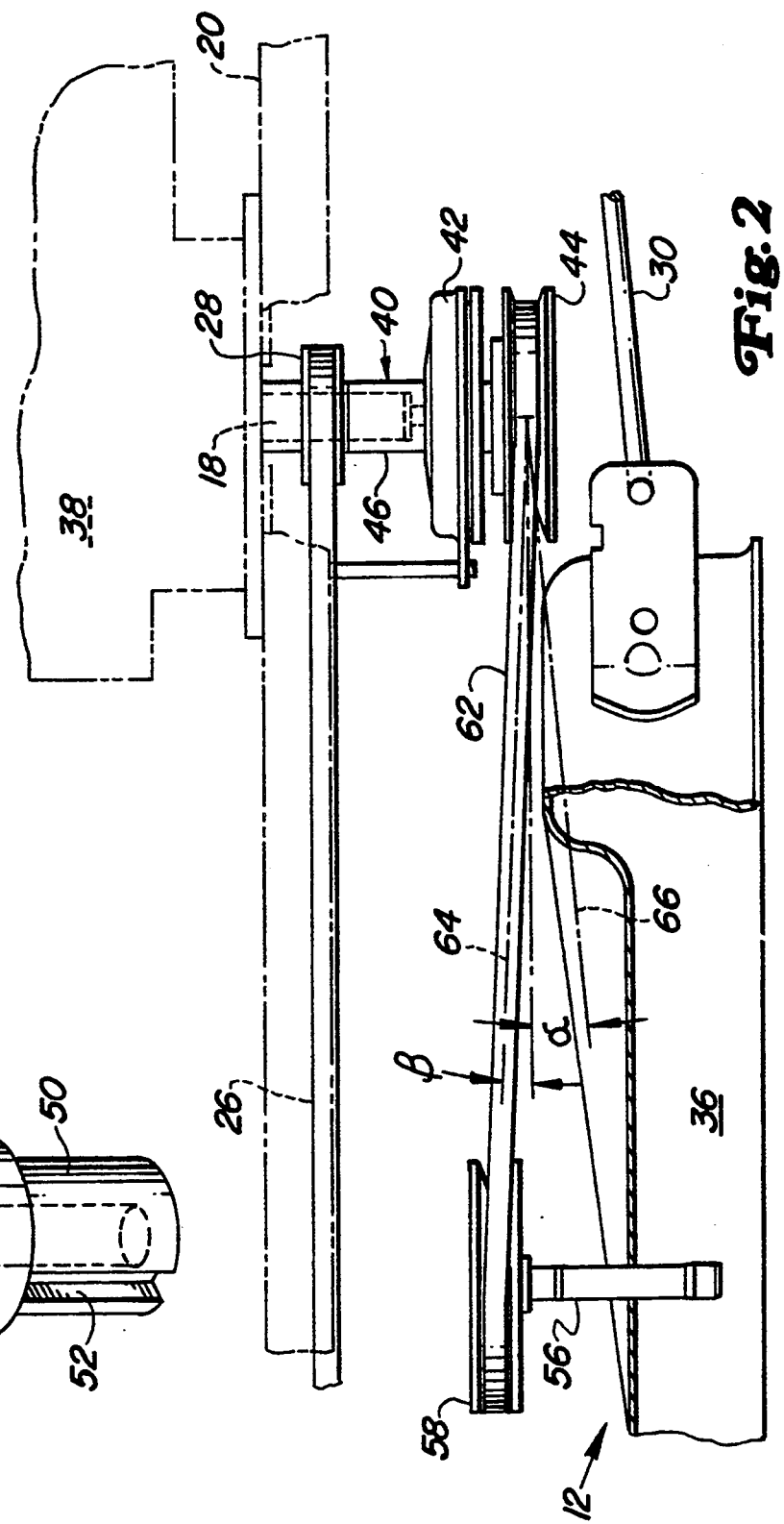
FIG. 2 illustrates a schematically enlarged and partial side view of the vehicle chassis, the engine crankshaft drive structure and the implement, particularly illustrating the range of vertical adjustment of the implement and resulting angles of belt entry and exit.
Figure 3:
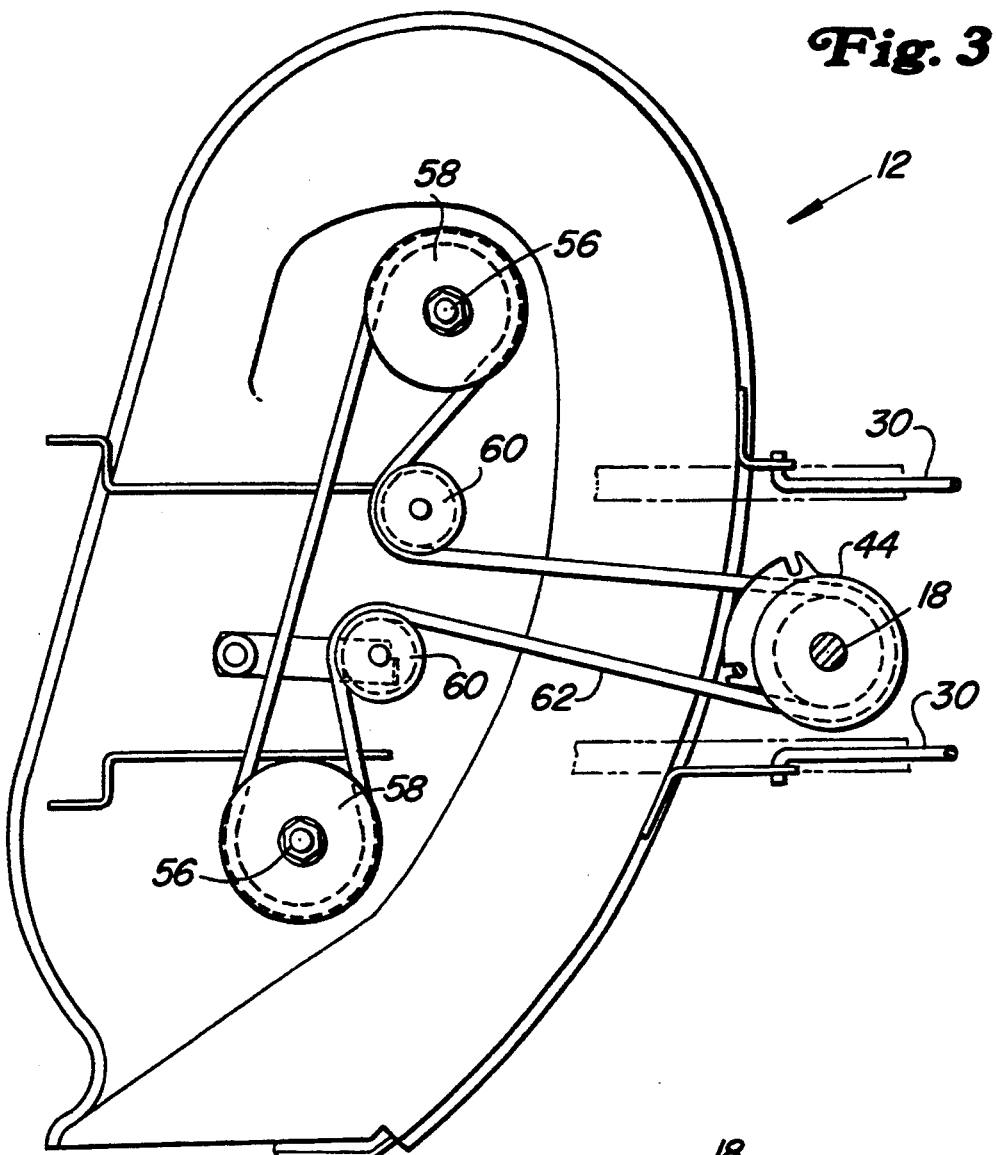
FIG. 3 illustrates a plan view of the implement belt drive arrangement and its relationship to the engine and drive pulley.

In FIGS. 2 and 3, enlarged schematic side views of the drive structure are shown. Illustrated in partial by phantom outline, is the engine 38 which is carried on the chassis 20. The engine 38 includes the downwardly extending crankshaft 18, which carries on its upper end portion a drive wheel pulley 28. The drive belt 26 is entrained around the pulley 28 and extends to the rear of the vehicle 10 to drive a transaxle (not shown) which extends between the drive wheels 24.

Further carried on the crankshaft 18 is a stub or shaft extension 40 for extending the crankshaft's downwardly projected length.

A clutch means the preferred embodiment takes the form of an electric clutch 42, mounted in on the stub shaft or crankshaft extension 40 to allow for convenient engagement and disengagement of the drive pulley 44 and thereby, transmission of power to the rotary mower 12.

Figure 4:
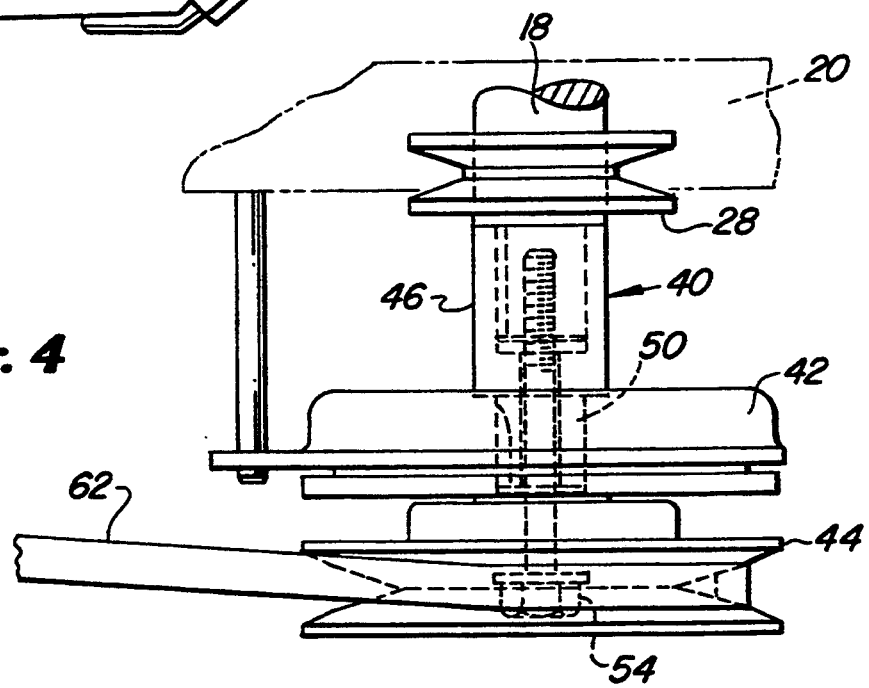
FIG. 4 illustrates an enlarged schematic and partial side view of the crankshaft extension and drive pulley structure.

Looking more closely at FIGS. 4 and 5, the stub shaft extension 40 includes a first portion, or collar 46, which has a keyed slot 48 and is adapted to mate with and slip over the end of the crankshaft 18. At its lower end, the stub shaft 40 includes an extension 50 that preferably has the same cross section as the crankshaft 18 so that the electric clutch 42 and drive pulley 44 can be conveniently mounted on it. A keyed slot 52 is provided in the shaft extension 50 for securing the electric clutch 42 and drive pulley 44 for rotation with it. A bolt fastening means 54 is provided to secure the shaft extension 40 to the crankshaft 18 and, in combination with the keyed mating surfaces between the collar 46 and crankshaft 18, provides for positive power transmission between the crankshaft 18 and the shaft extension 40.

In FIG. 3, there is provided a plan view of the rotary mower 12 which includes two blades and respective vertically extending spindles 56, each spindle 56 having a driven pulley 58 thereon for powering its respective blade. Additionally provided are belt tightening pulleys 60 and one of which is biased by a spring to maintain tension upon the belt 62 as the implement 12 is vertically adjusted and/or moves up and down as it passes over uneven terrain.

In FIG. 2, center lines through the belt's upper and lower positions show its range of vertical adjustment. As illustrated, the drive pulley 44 and implement driven pulleys 58 are on a substantially similar horizontal plane which provides for minimizing the angle of entry and exit of the belt 62 into and out of the pulleys 44, 58 and 60 as the implement height is adjusted. In the preferred embodiment, the angle of entry and exit of the belt 62 into the drive pulley 44 as it returns from the implement tensioning pulley 60, when the implement 12 is in its lowest adjusted position, is designated alpha and would be approximately 5½ degrees below horizontal. When the implement 12 is in its highest adjusted position, that being 3½ inches of grass cut, the angle beta or angle of misalignment of the belt 62 into and out of the drive pulley 44 would be approximately 3.7 degrees above horizontal. It is preferred that the angles of misalignment of the belt 62 into and out of the drive pulley 44 be maintained at or below 6 degrees from horizontal in order to minimize belt life problems.

With the crankshaft extension 40, it is possible to lower the drive pulley 44 beneath the chassis 20 of the vehicle 10 to provide for mounting the drive pulley 44 more closely horizontal with the implement pulleys 58 and 60 to minimize the belt's angle of entry and exit into and out of the pulleys 44, 58, and 60. Further, it is possible to utilize standard, off-the-shelf type engines having standard crankshaft lengths to avoid the cost of using special order engines having longer crankshafts. It is also possible to utilize the standard vehicle chassis design and avoid modification to the chassis as could be required to lower the crankshaft position relative to the chassis.

With the present invention there is provided a crankshaft extension 40 which enables positioning the drive shaft pulley 44 at a plane substantially horizontal with the driven implement pulleys 58 and 60 to keep the angles of entry and exit of the belt into and out of the pulleys 44, 58 and 60 within a desired range so as to minimize belt wear and belt maintenance problems. Through utilizing the stub shaft extension 40, the lower belt drive pulley 44 further avoids the need for utilizing a jacksheave arrangement to step the power transmission down to the level of the implement pulleys 58 and 60 which could reduce implement clearance beneath the vehicle 10 and therefore its range of vertical operation.

I claim:

1. An improved implement drive structure usable with the combination of a vehicle having a chassis, at least one drive wheel, an engine carried by a vehicle chassis and mounted with its crankshaft projecting downwardly from the chassis, and a vertically adjustable implement carried by the vehicle and having a pulley carried thereon,
    said drive structure including:
        collar means secured with the crankshaft and extending downwardly from the end thereof,
        a drive pulley removably secured with the collar means below the end of the crankshaft and an endless belt means entrained around the drive and implement pulleys whereby the drive pulley and implement pulley are operably positioned in a substantially common plane as the implement and its pulley are vertically adjusted and,
    clutch means operatively coupled with the collar means for driveably engaging belt means with the pulleys.

2. The invention defined in claim 1 wherein the collar means is adapted to carry an electric clutch means with the drive pulley being carried vertically spaced below the clutch means.

3. The invention defined in claim 2 wherein bolt means is provided to secure the electric clutch means and drive pulley to the crankshaft.

4. The invention defined in claim 1 wherein the implement pulley has a vertical range of adjustment relative to the drive pulley of less than 12 degrees.

5. The invention defined in claim 1 wherein a vehicle drive wheel pulley is carried by the crankshaft vertically spaced above the collar means.

6. The invention defined in claim 1 wherein the collar means is fixed to the crankshaft by key means.

7. An improved implement drive structure useable with a vehicle having a chassis, a drive wheel, an engine carried by the vehicle with a crankshaft extending generally vertically from the chassis, and a vertically adjustable implement carried by the vehicle having a driven pulley; the drive structure including:
    a crankshaft extension means secured with the crankshaft and extending downwardly therefrom;

electric clutch means mounted on the extension means; and a drive pulley carried by and rotatably fixed with the extension means, vertically spaced from the clutch means, the drive and driven pulleys being operably positioned in a substantially common plane as the implement is vertically adjusted.

8. The invention defined in claim 7 wherein a drive wheel pulley is carried by the crankshaft vertically spaced from the clutch means.

9. The invention defined in claim 7 wherein the extension means is comprised of a collar adapted to be fixedly mounted to the end of the crankshaft with the collar including a shaft extension upon which the clutch means can be carried.

* * * * *